United States Patent
Stewart (10) Patent No.: US 10,062,271 B2
(45) Date of Patent: Aug. 28, 2018

(54) EMERGENCY ALERT SYSTEM (EAS) ATSC ALARMS

(71) Applicant: THOMSON LICENSING, Issy-les-Moulineaux (FR)

(72) Inventor: John Sidney Stewart, Indianapolis, IN (US)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/501,713

(22) PCT Filed: Jul. 27, 2015

(86) PCT No.: PCT/US2015/042166
§ 371 (c)(1),
(2) Date: Feb. 3, 2017

(87) PCT Pub. No.: WO2016/025149
PCT Pub. Date: Feb. 18, 2016

(65) Prior Publication Data
US 2017/0229005 A1    Aug. 10, 2017

Related U.S. Application Data

(60) Provisional application No. 62/036,700, filed on Aug. 13, 2014.

(51) Int. Cl.
*G08B 1/08* (2006.01)
*G08B 27/00* (2006.01)
(Continued)

(52) U.S. Cl.
CPC ............ *G08B 27/005* (2013.01); *G08B 17/00* (2013.01); *G08B 17/10* (2013.01); *G08B 21/14* (2013.01);
(Continued)

(58) Field of Classification Search
CPC ...... G08B 25/004; G08B 25/08; G08B 27/00; G08B 27/001; G08B 27/003;
(Continued)

(56) References Cited

U.S. PATENT DOCUMENTS 5,587,705 A * 12/1996 Morris ................... G08B 7/066
340/326
6,121,885 A * 9/2000 Masone ................. G08B 17/10
340/286.05
(Continued)

FOREIGN PATENT DOCUMENTS

WO    WO 2006026025 A2 * 3/2006 ............. G08B 17/00

OTHER PUBLICATIONS

ISR for International Patent Application No. PCT/US2015/042166 dated Oct. 1, 2015.

*Primary Examiner* — Adnan Aziz
(74) *Attorney, Agent, or Firm* — Brian J. Dorini; Joseph J. Opalach (57) ABSTRACT

A method for operating a consumer communication device is described including receiving content from a service provider, determining if the received content is an emergency alert system notification and communicating the emergency alert system notification to a communication device, if the received content is the emergency alert system notification. Further described is a method for operating an enhanced detection device including receiving an emergency alert system notification, determining if the emergency alert system notification is communicated best by means of sounding an alarm or by means of vocalizing the emergency alert system notification and communicating the emergency alert system notification through a protected structure by means of initiating an alarm or by means of verbalizing the emergency alert system notification.

4 Claims, 7 Drawing Sheets

(51) Int. Cl.
*H04W 84/12* (2009.01)
*G08B 17/10* (2006.01)
*G08B 21/14* (2006.01)
*G08B 25/10* (2006.01)
*G08B 25/08* (2006.01)
*G08B 25/00* (2006.01)
*G08B 17/00* (2006.01)

(52) U.S. Cl.
CPC ............ *G08B 25/004* (2013.01); *G08B 25/08* (2013.01); *G08B 25/085* (2013.01); *G08B 25/10* (2013.01); *G08B 27/008* (2013.01); *H04W 84/12* (2013.01)

(58) Field of Classification Search
CPC .... G08B 27/005; G08B 27/008; G08B 17/00; G08B 17/10; G08B 25/00; G08B 25/002; G08B 25/007; G08B 25/009; G08B 25/085; G08B 25/10
See application file for complete search history.

(56) References Cited

U.S. PATENT DOCUMENTS

| | | | | |
|---|---|---|---|---|
| 6,144,310 A * | 11/2000 | Morris | | G08B 21/12 340/505 |
| 6,323,780 B1 * | 11/2001 | Morris | | G08B 7/066 340/505 |
| 6,420,973 B2 * | 7/2002 | Acevedo | | G08B 7/06 340/522 |
| 6,522,248 B1 * | 2/2003 | Deeds | | G08B 3/10 340/511 |
| 6,710,715 B2 * | 3/2004 | Deeds | | G01W 1/10 340/286.11 |
| 6,778,082 B2 * | 8/2004 | Goodwin | | G08B 7/06 340/508 |
| 7,019,646 B1 * | 3/2006 | Woodard | | G08B 17/10 340/539.26 |
| 7,039,387 B2 * | 5/2006 | Macolly, Jr. | | G06Q 10/06311 340/539.13 |
| 7,417,540 B2 * | 8/2008 | Johnston | | G08B 17/00 340/12.16 |
| 7,893,825 B2 * | 2/2011 | Gonzales | | G08B 25/04 340/506 |
| 8,027,659 B1 | 9/2011 | Daly et al. | | |
| 8,988,232 B1 * | 3/2015 | Sloo | | G01N 27/02 340/602 |
| 2001/0041980 A1 * | 11/2001 | Howard | | G10L 15/1822 704/270 |
| 2003/0069002 A1 | 4/2003 | Hunter et al. | | |
| 2004/0085218 A1 * | 5/2004 | Pecora | | G08B 5/36 340/815.4 |
| 2004/0183687 A1 * | 9/2004 | Petite | | G05B 19/042 340/601 |
| 2006/0271314 A1 * | 11/2006 | Hayes | | G01D 4/002 702/62 |
| 2007/0109114 A1 * | 5/2007 | Farley | | G08B 17/00 340/506 |
| 2007/0194906 A1 * | 8/2007 | Sink | | G08B 17/10 340/506 |
| 2007/0207771 A1 | 9/2007 | Bowser et al. | | |
| 2007/0216535 A1 * | 9/2007 | Carrino | | G06F 17/3087 340/573.1 |
| 2007/0296575 A1 * | 12/2007 | Eisold | | G08B 27/006 340/539.16 |
| 2008/0055097 A1 * | 3/2008 | Chidakel | | G08B 7/06 340/628 |
| 2008/0186135 A1 * | 8/2008 | Boling | | G01S 5/0009 340/7.51 |
| 2009/0031340 A1 * | 1/2009 | Modi | | G08B 27/008 725/33 |
| 2009/0134982 A1 | 5/2009 | Robertson et al. | | |
| 2009/0247110 A1 | 10/2009 | Sennett et al. | | |
| 2010/0075591 A1 | 3/2010 | Eyer et al. | | |
| 2010/0107192 A1 * | 4/2010 | Sennett | | G08B 6/00 725/33 |
| 2011/0128144 A1 * | 6/2011 | Baron, Sr. | | G01W 1/00 340/539.3 |
| 2013/0183924 A1 | 7/2013 | Saigh et al. | | |
| 2014/0031082 A1 * | 1/2014 | Zishaan | | G08B 21/12 455/556.1 |
| 2014/0062297 A1 * | 3/2014 | Bora | | H05B 33/0863 315/34 |
| 2014/0062693 A1 | 3/2014 | Watts et al. | | |
| 2014/0313044 A1 * | 10/2014 | Thompson | | G08B 21/10 340/686.6 |
| 2015/0065078 A1 * | 3/2015 | Mejia | | G08B 17/00 455/404.1 |
| 2015/0077737 A1 * | 3/2015 | Belinsky | | G01N 15/0211 356/51 |
| 2015/0109104 A1 * | 4/2015 | Fadell | | G08B 27/003 340/5.65 |
| 2015/0187194 A1 * | 7/2015 | Hypolite | | G08B 7/06 340/628 |
| 2015/0332580 A1 | 11/2015 | Bokhary | | |

* cited by examiner

FIG. 8 ic content is an emergency alert system notification and the consumer communication device communicating the emergency alert system notification to a communication device, if the received content is an emergency alert system notification. Further described is a communication device including a network adapter for receiving an emergency alert system notification and the communication device communicating the emergency alert system notification to an enhanced detection device. Further described is an enhanced detection device including a network adapter for receiving an emergency alert system notification, the enhanced detection device determining if the emergency alert system notification is communicated best by means of sounding an alarm or by means of vocalizing the emergency alert system notification and communicating the emergency alert system notification through a protected structure by means of initiating an alarm or by means of verbalizing the emergency alert system notification.

EMERGENCY ALERT SYSTEM (EAS) ATSC ALARMS

This application claims the benefit, under 35 U.S.C. § 365 of International Application PCT/US2015/042166, filed 27 Jul. 2015, which was published in accordance with PCT Article 21(2) on 18 Feb. 2016 in English and which claims the benefit of U.S. provisional patent application No. 62/036,700, filed 13 Aug. 2014.

FIELD OF THE INVENTION

The present invention relates to use of enhanced detection devices that are in communication with the Emergency Alert System (EAS) to alert users of both in building alarm situations and EAS notifications.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Currently, people receive EAS alerts (notifications, messages, alarms) using their telephone (e.g., reverse 911 systems), AM/FM radio, or via dedicated weather alert radios. However, if the TV or radio are not turned on, then the EAS notifications will not be detected. Thus, a problem addressed by the proposed method and apparatus is to provide EAS notifications within a residence or small commercial environment using enhanced detection devices. Such enhanced detection devices include a network adapter in order to communicate with devices using wireless local area network technology to receive EAS notifications. It should be obvious that devices that can receive EAS notifications can also forward such EAS notifications to other devices such as other enhanced detectors.

SUMMARY OF THE INVENTION

There are many devices that are coming on the market today that include a wireless local area network technology transceiver. Such a transceiver allows an electronic device to exchange data or connect to the internet. As used herein WiFi is any such wireless local area network technology and not meant to include only those devices that are specifically certified as Wi-Fi. A recently released device is a combination smoke detector and carbon monoxide detector for a residential or small commercial environment. This enhanced detection device has some unique features that are quite advanced over existing detectors. For example, if one has multiple enhanced detectors in a residential or small commercial environment (building), the enhanced detectors can communicate with each other via WiFi and if one such enhanced detection device detects smoke, that enhanced device is able to alert the other enhanced detectors to sound an alarm as well. Also, this enhanced device has built-in voice capability so it is able to communicate where the alarm (smoke, carbon monoxide) has been detected in a human voice. Herein, smoke and carbon monoxide detectors are used the explain the proposed method and apparatus but the detectors may, in fact, be enhanced detectors adapted to detect other alerts or alarms such as motion detectors, freeze detectors, rain detectors, glass breakage detectors and the like. It should also be noted that while Wi-Fi and wireless local area network technology is used to explain the proposed method and apparatus, the proposed method and apparatus is not limited to wireless technologies but may also be used with wired line technologies.

Since such a device is basically an alarm connected to WiFi, it could be used for other purposes. The present invention proposes connecting to the Emergency Alert System (EAS) with these WiFi enabled enhanced detection devices to provide EAS alerts within a residence or small commercial building in addition to the detected alarms.

Many devices can use wireless local area network technology. For example, personal computers, video-game consoles, dual mode smartphones, some digital cameras, tablet computers and digital audio players all use wireless local area network technology. Such devices are called consumer communication devices herein. These devices can connect to a network resource such as the Internet via a wireless network access point. Such an access point can be for example, a cable modem or a satellite modem. If there are multiple devices then a cable modem or satellite modem may be used in conjunction with a router, bridge or brouter. Devices such as dual mode smartphones may be preconfigured to receive EAS notifications. Television stations in the United States as well as many other countries are mandated to transmit EAS notifications which are then received by televisions in the home. Many current televisions are also equipped with local area networking technology, both wired and wireless, giving them the capability to communicate EAS notifications over the local area network interface. In addition, many devices maintain some portion of their receiving circuitry active even when the device is "turned off" so that the devices are in a standby mode. This standby mode would give the devices the capability to receive and forward an EAS message even when not actively in use.

A method for operating a consumer communication device is described including receiving content from a service provider, determining if the received content is an emergency alert system notification and communicating the emergency alert system notification to a communication device, if the received content is the emergency alert system notification. Further described is a method for operating a communication device including receiving an emergency alert system notification and communicating the emergency alert system notification to an enhanced detection device. And further described is a method for operating an enhanced detection device including receiving an emergency alert system notification, determining if the emergency alert system notification is communicated best by means of sounding an alarm or by means of vocalizing the emergency alert system notification and communicating the emergency alert system notification through a protected structure by means of initiating an alarm or by means of verbalizing the emergency alert system notification.

A consumer communication device is described including a network adapter for receiving content from a service provider, consumer communication device determining if the received content is an emergency alert system notification and the consumer communication device, communicating the emergency alert system notification to a communication device, if the received content is the emergency alert system notification using the network adapter. Further described is a communication device including a network adaptor configured for receiving an emergency alert system notification and the network adaptor also communicating the emergency alert system notification to an enhanced detection device. And further described is an enhanced detection device including a network adaptor receiving an emergency alert system notification, a processor determining if the emergency alert system notification is communicated best by means of sounding an alarm or by means of vocalizing the emergency alert system notification and the network adaptor communicating the emergency alert system notification through a protected structure by means of initiating an alarm or by means of verbalizing the emergency alert system notification.

BRIEF DESCRIPTION OF THE DRAWINGS

The present invention is best understood from the following detailed description when read in conjunction with the accompanying drawings. The drawings include the following figures briefly described below.

It should be understood that the drawing(s) are for purposes of illustrating the concepts of the disclosure and is not necessarily the only possible configuration for illustrating the disclosure.

DETAILED DESCRIPTION OF THE PREFERRED EMBODIMENTS

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The proposed method and apparatus use the alarm capability of WiFi connected enhanced smoke/carbon monoxide detectors (DETECTOR) for the purpose of alerting a household to EAS notifications (messages). There are several methods through which the DETECTOR could receive the EAS alert.

1) Future generation TVs (e.g., ATSC 3.0 compatible) will have internet connections. Since it is mandated that the TV systems transmit EAS alerts, the TV could then connect to the DETECTOR via WiFi (or wired Ethernet connection) and sound an alarm.
2) The Detector has access to the internet, so it could periodically monitor a server that provides EAS alerts and sound an alarm if an EAS notification (alert, message, alarm) is detected.

3) The DETECTOR could be fitted with an EAS receiver. This method has the downside of larger power consumption. This is not a good attribute since many of the DETECTORs may be powered via battery but would be advantageous in detection systems that are hard-wired.

The enhanced detection devices also include a web site and mobile phone application (APP) that gives users access to the status of the DETECTORs whether one is presently at the residence or small commercial building (protected structure) or away. This would give users the capability to be notified if an EAS alarm had been received at the protected structure but the user was away at the time. The enhanced detection device software also knows the address of the protected structure (environment, building) since the address is input as part of the software setup. Knowing the address of the protected structure will let the DETECTORs know if an EAS alert pertains to the protected structure at the address. The proposed method modifies the existing software to bring up a web link pertaining to the specific weather in the area if an EAS weather alert is received.

Finally, there has been a lot of confusion over the difference between a weather warning and a weather watch (e.g., tornado warning vs tornado watch, flood warning vs. flood watch). A watch happens when the weather is conducive to an event but the event has not been detected. A warning is when the event has been detected and is much more serious. Since the enhanced detection devices have a voice capability, it could be more instructive and actually use the voice capability to describe what is happening (e.g., "The weather in your area is conducive for a tornado. Make preparations in case of an event." vs "A tornado has been detected in your area, take cover immediately"). It could also play out the audio contained in the EAS alert. That is, any notifications, alerts, alarms described above could be communicated using the voice capability as opposed to merely sounding an alarm.

Figure 1:
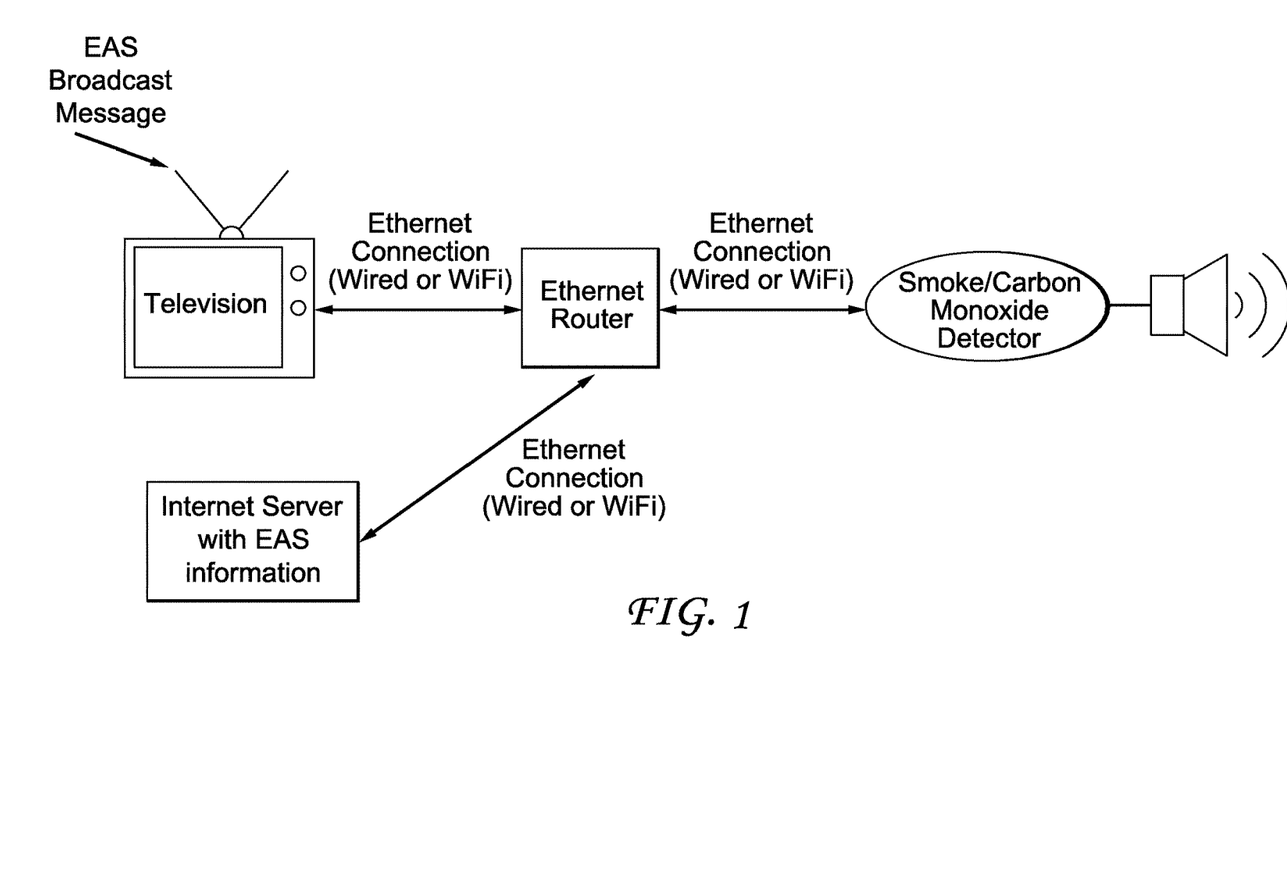
FIG. 1 is a schematic diagram of the proposed system in accordance with the principles described herein.

FIG. 1 is a schematic diagram of the proposed system of the in accordance with the principles described herein. FIG. 1 shows an enhanced detection device (such as a smoke or carbon monoxide detector). The enhanced detection device is in communication with other such enhanced detection devices in the same protected structure so that any or all of the enhanced detection devices can sound an alarm based on the detected condition. The proposed system extends the use of the enhanced detection devices by using a router (such as an Ethernet router, a bridge or a brouter). Routers and like devices are called communication devices herein. Each enhanced detection device has a network adapter in order to communicate with each other as well as to communication with any communication device. The router (router, bridge or brouter) is in communication with a device which receives EAS multicast notifications (alerts, messages, alarms) such as an ATSC 3.0 television or any other device capable of receiving EAS alerts, such as personal computers, laptop computers, notebook computers, dual mode smartphones, tablet computers and the like. If an EAS notification is received by any consumer communication device in the protected structure then the consumer communication device forwards (communicates, transmits, sends) the EAS notification to the communication device, which is turn forwards (communicates, transmits, sends) the EAS notification to the enhanced detection device. A TV is shown in FIG. 1 but the TV may be replaced with any other device configured to receive EAS multicast notifications. Communication devices are also equipped with network adapters in order to communicate with the enhanced detection devices as well as consumer communication devices, which are also equipped with network adapters for the same reason. In the alternative or in addition to such devices configured to receive EAS multicast notifications, the router may be in communication with an Internet server having EAS information. Such EAS information may be multicast directly to the router. The router, in turn, forwards (transmits, communicates) the EAS notifications to the enhanced detection devices, which, in turn, sound an alarm or vocalize the notification. Among the enhanced detection devices there may be a master enhanced detection device which receives the EAS notifications and communicates the EAS notifications to any slaved enhanced detection devices or all of the enhanced detection devices may receive the EAS notifications simultaneously. If there is a master enhanced detection device, such a master detection device may make a decision as to whether to sound an alarm or use the voice capability to communicate the EAS notification to the users present in the protected structure. The master enhanced detection device forwards the emergency alert system notification as well as the means by which any slaved enhanced detection devices are to communicate the emergency alert system notification to anyone present in the protected structure. The master enhanced detection device accesses a web link pertaining to the specific weather in the area if an EAS weather (flood or earthquake) notification is detected. The further information obtained from the web link may be verbally communicated to users present in the protected structure.

Figure 2:
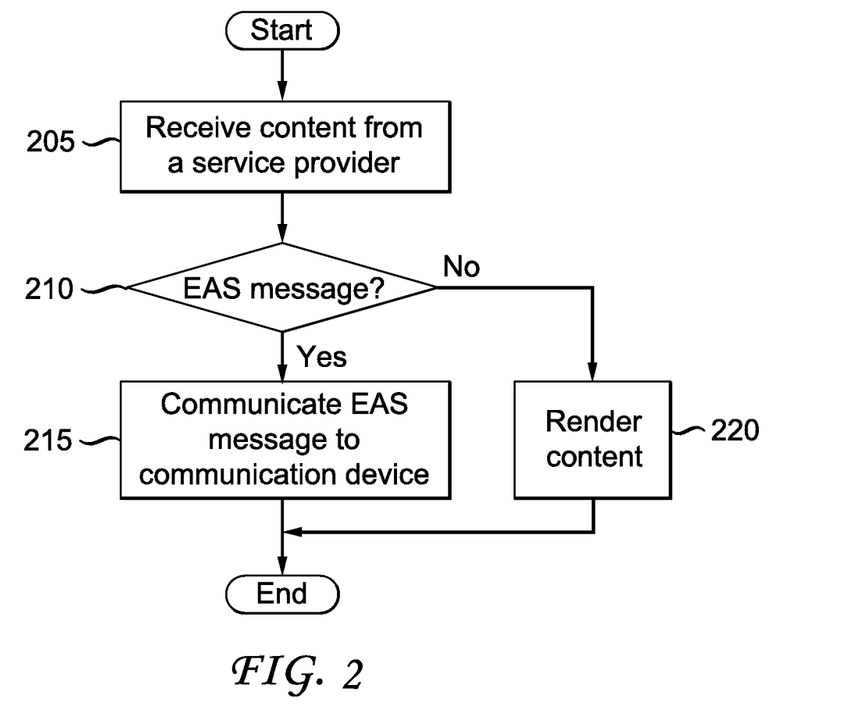
FIG. 2 is a flowchart of the operation of a consumer communication device in accordance with the principles described herein.

FIG. 2 is a flowchart of the operation of a consumer communication device in accordance with the principles described herein. At 205 the consumer communication device receives content from a service provider. At 210 a determination is made if the received content is an emergency alert system message (notification, alert, alarm). If the received content is not an EAS notification then at 220 the content is rendered. If the received content is an emergency alert system notification then at 215 the EAS notification is communicated (forwarded, sent, transmitted) to a communication device in the protected structure.

Figure 3:
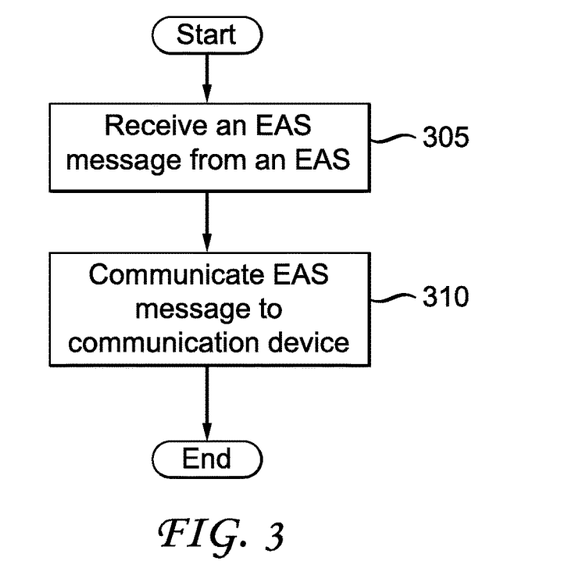
FIG. 3 is a flowchart of the operation of a server in accordance with the principles described herein.

FIG. 3 is a flowchart of the operation of a server in accordance with the principles described herein. At 305 the server receives an EAS notification from an EAS. At 310 the server communicates (forwards, sends, transmits) the EAS notification to a communication device in the protected structure.

Figure 4:
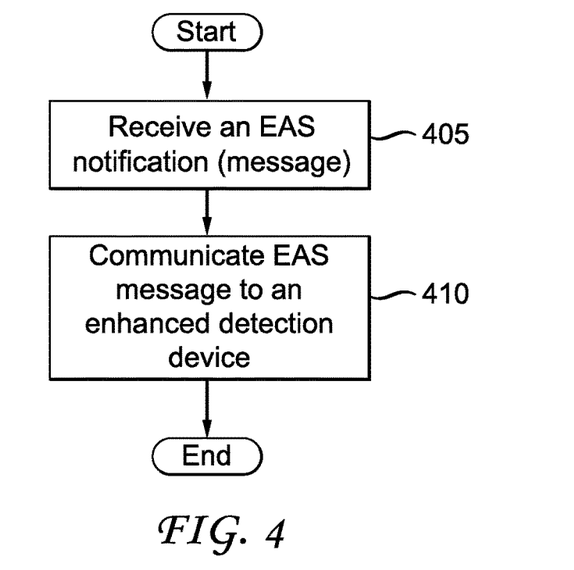
FIG. 4 is a flowchart of the operation of a communication device in accordance with the principles described herein.

FIG. 4 is a flowchart of the operation of a communication device in accordance with the principles described herein. At 405 the communication device receives an EAS notification. The EAS notification may come from a server or a consumer communication device. At 410 the communication device communicates (forwards, sends, transmits) the EAS notification to an enhanced detection device in the protected structure.

Figure 5:
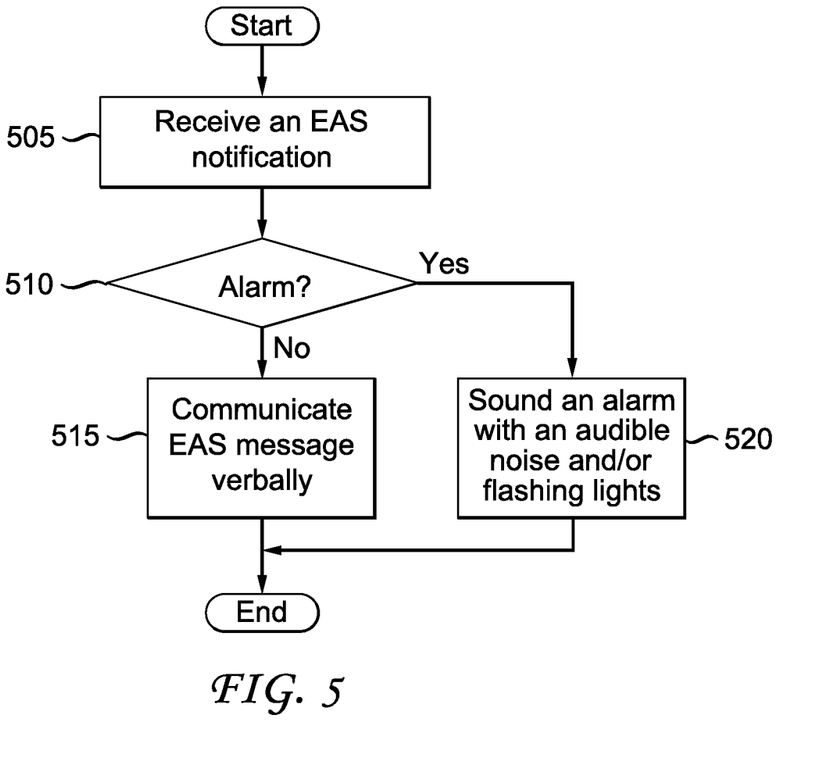
FIG. 5 is a flowchart of the operation of an enhanced detection device in accordance with the principles described herein.

FIG. 5 is a flowchart of the operation of an enhanced detection device in accordance with the principles described herein. At 505 the enhanced detection device receives an EAS notification from a communication device. At 510 a determination is made regarding the best means by which to alert anyone present in the protected structure. This determination may be based at least in part on whether the enhanced detection was set-up to use flashing lights in addition to or as an alternative to an audible alarm. This may be the case if there are any hearing impaired persons usually in the protected structure. If the determination is made to use an audible alarm or flashing lights then at 520 the alarm and/or lights are initiated. If the determination is made not to use an audible alarm or flashing lights then at 515 communication of the EAS notification is initiated by verbal communication by using a voice synthesizer or the equivalent. If the receiving enhanced detection device is a master enhanced detection device then the master enhanced detection device forwards the emergency alert system notification to other enhanced detection devices in the protected structure. In addition to forwarding the EAS notification to other enhanced detection devices by the master enhanced detection device, the master enhanced detection device also forward instructions to the other enhanced detection devices as to a means by which the emergency alert system notification is to be communicated by the other enhanced detection devices. Further, the enhanced detection device can access a web link provided in the emergency alert system notification and retrieve any additional information regarding the emergency alert system notification. The enhanced detection device then verbally provides the additional information regarding the emergency alert system notification to anyone present in the protected structure.

The consumer communication device depicted in FIG. 1 includes a network adapter for receiving content from a service provider. The consumer communication device also includes a processor for determining if the received content is an emergency alert system notification. If the received content is an emergency alert system notification then the consumer communication device communicates the emergency alert system notification to a communication device using the network adapter. The network adapter may be used for receiving communications (including content and EAS notifications as well as Internet access) and for forwarding (transmitting, sending, communicating) EAS notifications to a communication device.

The server of FIG. 1 has significant processing power by virtue of the fact that a server stores, processes and communicates large volumes of content. The server is further adapted to (has the means to) receive an EAS notification and (the means to) forward (transmit, send, communicate) EAS notifications to a communication device. The EAS notification may be received from an EAS system. A communications interface of the server receives EAS notifications and communicates (forwards, transmits, sends) EAS information to the communication device upon request from the communication device (which received the request from the enhanced detection device or the consumer communication device).

The communication device of FIG. 1 includes a network adapter for communicating with consumer communication devices and/or a server. The communication device also has a processor. The communication device has the means for receiving an EAS notification and (the means to) forward (transmit, send, communicate) EAS notifications to an enhanced detection device. The notification is received via the network adapter and is forwarded to an enhanced detection device via the network adapter.

The enhanced detection device of FIG. 1 includes a network adapter for communicating with a communication device. The enhanced detection device receives an EAS notification from the communication device via the network adapter. The enhanced detection device also includes a processor which, upon receipt of the EAS notification makes a determination regarding the best means by which to alert anyone present in the protected structure. This determination may be based at least in part on whether the enhanced detection was set-up to use flashing lights in addition to or as an alternative to an audible alarm. This may be the case if there are any hearing impaired persons usually in the protected structure. If the determination is made to use an audible alarm or flashing lights then the enhanced detection device initiates the alarm and/or flashing lights. This is accomplished with any circuit well known in the art. If the determination is made not to use an audible alarm or flashing lights then the enhanced detection device initiates communication of the EAS notification verbally using a voice (or speech) synthesizer or the equivalent, which is also included in the enhanced detection device. Using the network adapter the enhanced detection device is able to forward the emergency alert system notification to other enhanced detection devices in the protected structure. Using the network adapter the enhanced detection device is also able to forward instructions as to the best means by which the emergency alert system notification is to be communicated by the other enhanced detection devices. Using the network adapter the enhanced detection device is also able to access a web link provided in the emergency alert system notification and (has the means to) retrieve any additional information regarding the emergency alert system notification. The enhanced detection device verbally provides the additional information regarding the emergency alert system notification using a speech synthesizer.

Figure 6:
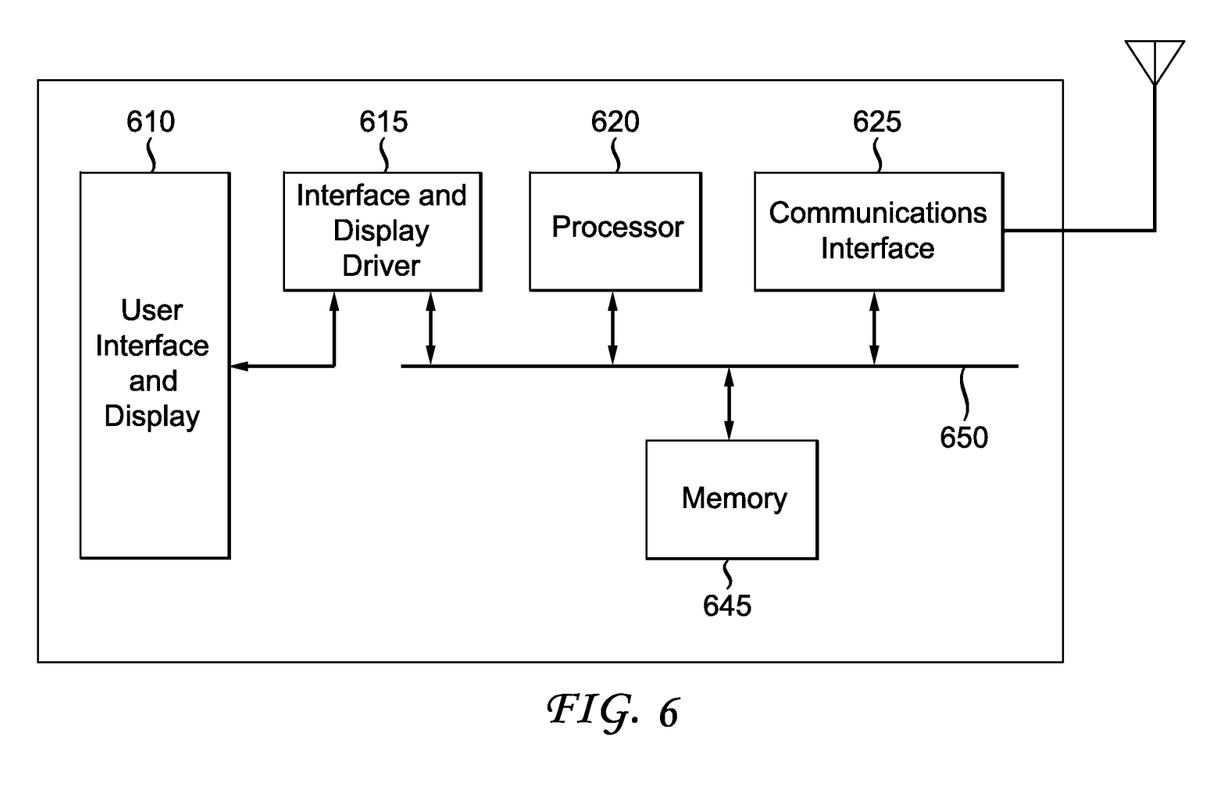
FIG. 6 is an exemplary block diagram of a consumer communication device in accordance with the principles described herein.
Figure 7:
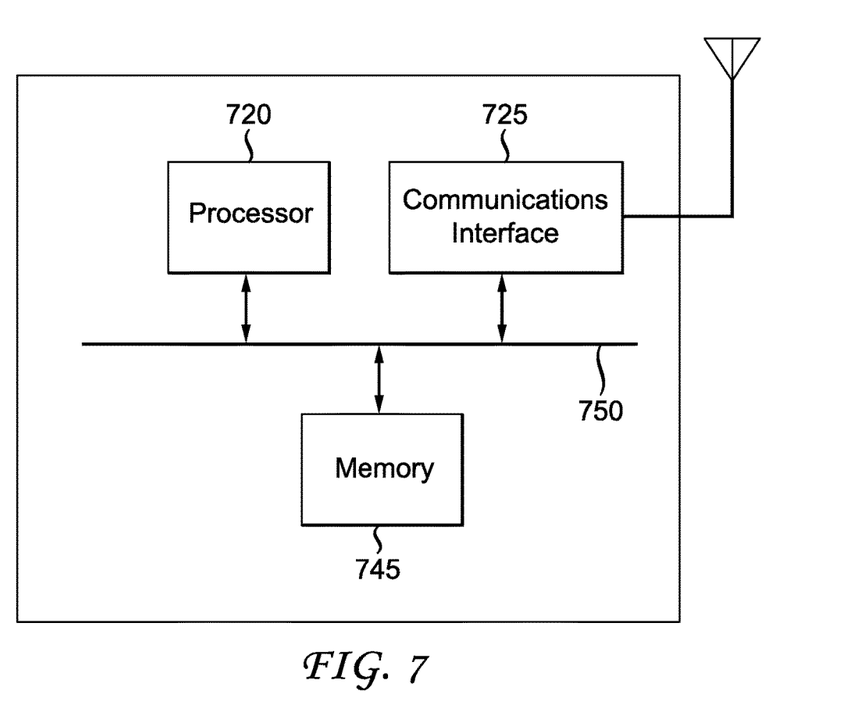
FIG. 7 is an exemplary block diagram of a communication device in accordance with the principles described herein.

FIG. 6 is an exemplary block diagram of a consumer communication device in accordance with the principles described herein. The block diagram configuration includes a bus-oriented 650 configuration interconnecting a processor 620, and a memory 645. The configuration of FIG. 6 also includes a communications interface 625 to enable communications with a communication device such as a router, bridge or brouter or any other sort of gateway device such as shown in FIG. 7 and described below and throughout the text above. The consumer communication device may utilize either a wired or a wireless interface to the communication device.

Processor 620 provides computation functions for the consumer communication device. The processor 620 can be any form of CPU or controller that utilizes communications between elements of the consumer communication device to control communication and computation processes. Those of skill in the art recognize that bus 650 provides a communication path between the various elements of the exemplary embodiment and that other point-to-point interconnection options (e.g. non-bus architecture) are also feasible. The processor determines determining if the received content is an emergency alert system notification Memory 645 can act as a repository for memory related to any of the methods that incorporate the functionality of the consumer communication device. Memory 645 can provide the repository for storage of information such as program memory, downloads, uploads, or scratchpad calculations as well as the storage of streamed or downloaded content. Those of skill in the art will recognize that memory 645 may be incorporated all or in part of processor 620. Communications interface 625 has both receiver and transmitter elements for communication as known to those of skill in the art. Communications interface 625 also includes a network adaptor (not shown) for enabling communications with the communication device. Communications interface is the means by which broadcast content is received as well. The communications interface receives content from a service provider via the network adaptor. The communications interface transmits the emergency alert system notification to the communication device, if the received content is the emergency alert system notification using the network adapter User interface and display 610 is driven by interface and display driver circuitry 615. The user interface and display 610 is used as a multimedia interface having both audio and video capability to display streamed or downloaded audio and/or video obtained via communications interface 625.

FIG. 7 is an exemplary block diagram of a communication device in accordance with the principles described herein. The block diagram configuration includes a bus-oriented 750 configuration interconnecting a processor 720, and a memory 745. The configuration of FIG. 7 also includes a communications interface 725 to enable communications with a consumer communication device such as described above and shown in FIG. 6 and an enhanced detection device such as described above and below with reference to FIG. 8. The communication device may utilize either a wired or a wireless interface to the consumer communication device and the enhanced detection device and the Internet server with EAS information (shown in FIG. 1).

Processor 720 provides computation functions for the communication device. The processor 720 can be any form of CPU or controller that utilizes communications between elements of the communication device to control communication and computation processes. Those of skill in the art recognize that bus 750 provides a communication path between the various elements of the exemplary embodiment and that other point-to-point interconnection options (e.g. non-bus architecture) are also feasible.

Memory 745 can act as a repository for memory related to any of the methods that incorporate the functionality of the communication device. Memory 745 can provide the repository for storage of information such as program memory, downloads, uploads, or scratchpad calculations as well as the storage of streamed or downloaded content. Those of skill in the art will recognize that memory 745 may be incorporated all or in part of processor 720. Communications interface 725 has both receiver and transmitter elements for communication as known to those of skill in the art. Communications interface 725 also includes a network adaptor (not shown) for enabling communications with the consumer communication device, the enhanced detection device and the Internet server with EAS information.

Figure 8:
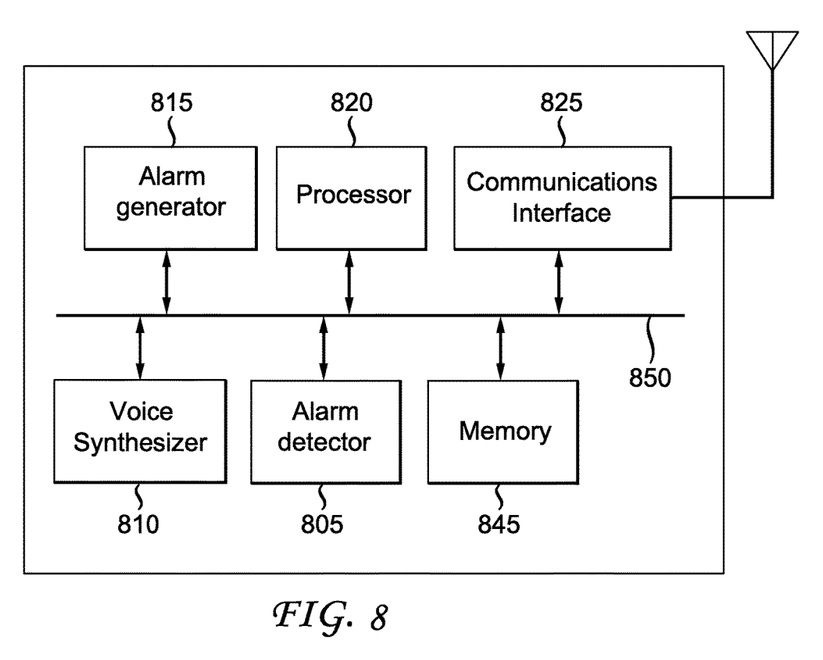
FIG. 8 is an exemplary block diagram of an enhanced detection device in accordance with the principles described herein.

FIG. 8 is an exemplary block diagram of an enhanced detection device in accordance with the principles described herein. The block diagram configuration includes a bus-oriented 850 configuration interconnecting a processor 820, and a memory 845. The configuration of FIG. 8 also includes a communications interface 825 to enable communications with a communication device such as described above and shown in FIG. 7 and other enhanced detection devices. The enhanced detection device may utilize either a wired or a wireless interface to the communication device.

Processor 820 provides computation functions for the enhanced detection device. The processor 820 can be any form of CPU or controller that utilizes communications between elements of the enhanced detection device to control communication and computation processes. Those of skill in the art recognize that bus 850 provides a communication path between the various elements of the exemplary embodiment and that other point-to-point interconnection options (e.g. non-bus architecture) are also feasible. The processor determines if the emergency alert system notification is communicated best by means of sounding an alarm or by flashing lights or by means of vocalizing said emergency alert system notification Memory 845 can act as a repository for memory related to any of the methods that incorporate the functionality of the enhanced detection device. Memory 845 can provide the repository for storage of information such as program memory, downloads, uploads, or scratchpad calculations as well as the storage of EAS alarms and alarm history. Those of skill in the art will recognize that memory 845 may be incorporated all or in part of processor 820. Communications interface 825 has both receiver and transmitter elements for communication as known to those of skill in the art. Communications interface 825 also includes a network adaptor (not shown) for enabling communications with the communication device.

The enhanced detection device includes an alarm detector 805 for detecting emergency alarms including but not limited to smoke, carbon monoxide, motion detectors, freeze detectors, rain detectors, glass breakage detectors and the like. Such enhanced detection devices may also be able to receive medical or life alerts from people in possession of medical or life alert devices and in the vicinity of such enhanced detection devices.

The enhanced detection device also includes an alarm generator 815, which is used to sound tones or horns or make other such noises or flashing lights as directed by the processor 820 in order to alert persons present in the protected structure. Processor makes a determination which means to use to alert persons present in the protected structure based on preferences set by a user during set-up of the enhanced detection device. The enhanced detection device optionally has a voice synthesizer for communicating an alert or alarm to person present in the protected structure based on user preferences set during set-up of the enhanced detection device.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the present invention is programmed.

Given the teachings herein, one of ordinary skill in the related art will be able to contemplate these and similar implementations or configurations of the present invention.

The invention claimed is:

1. A method for operating an enhanced detection device, said method comprising:
- receiving, by a network adaptor of said enhanced detection device, an emergency alert system notification;
- determining, by a processor of said enhanced detection device, if said emergency alert system notification is communicated best by means of sounding an alarm or by means of vocalizing said emergency alert system notification;
- communicating said emergency alert system notification through a protected structure by means of sounding said alarm, by a sound generator of said enhanced detection device, or by means of vocalizing said emergency alert system notification, by a voice synthesizer of said enhanced detection device;
- forwarding, by said network adaptor, said emergency alert system notification to other enhanced detection devices in said protected structure;
- accessing, by said network adaptor of said enhanced detection device, a web link provided in said emergency alert system notification;
- retrieving, by said network adaptor, any additional information regarding said emergency alert system notification from said web link; and
- communicating, by said voice synthesizer of said enhanced detection device, said additional information regarding said emergency alert system notification through said protected structure by vocalizing said additional information.

2. The method of claim 1, further comprising forwarding instructions to said other enhanced detection devices as to a means by which said emergency alert system notification is to be communicated by said other enhanced detection devices.

3. An enhanced detection device, comprising:
- a network adaptor of a communications interface for receiving an emergency alert system notification;
- a processor for determining if said emergency alert system notification is communicated best by means of sounding an alarm or by means of vocalizing said emergency alert system notification, said processor in bi-directional communications with said network adaptor of said communications interface; and
- an alarm generator for generating an alarm sound, said processor directing said alarm generator to sound the alarm to communicate said emergency alert system notification through a protected structure if it is determined said emergency alert system notification is communicated best by means of sounding the alarm;
- a voice synthesizer for vocalizing information, said processor directing said voice synthesizer to vocalize said emergency alert system notification to communicate said emergency alert system notification through the protected structure if it is determined said emergency alert system notification is communicated best by means of vocalizing said emergency alert system notification;
- said network adaptor of said communications interface forwarding said emergency alert system notification to other enhanced detection devices in said protected structure;
- said network adaptor of said communications interface accessing a web link provided in said emergency alert system notification;
- said network adaptor of said communications interface retrieving any additional information regarding said emergency alert system notification from said web link; and
- the voice synthesizer for vocalizing said additional information regarding said emergency alert system notification to communicate said additional information through the protected structure.

4. The enhanced detection device of claim 3, wherein said network adaptor of said communications interface forwards instructions to said other enhanced detection devices as to a means by which said emergency alert system notification is to be communicated by said other enhanced detection devices.

* * * * *